Patented June 8, 1926.

1,587,637

UNITED STATES PATENT OFFICE.

GEORGE ENNIS FERGUSON, OF SPRING VALLEY, NEW YORK, ASSIGNOR TO PYRENE MANUFACTURING COMPANY, OF NEWARK, NEW JERSEY, A CORPORATION OF DELAWARE.

FLUX.

No Drawing.     Application filed July 29, 1922. Serial No. 578,496.

This invention relates to fluxes of the kind adapted to be used in connection with soldering. The principal function of these fluxes has always been to remove the coating of oxide on a metal and other impurities on the surface of the material to be soldered. This coating prevents the metal from alloying with another metal, such as the solder.

Heretofore various types of fluxes have been used, such as zinc chloride, ammonium chloride, hydrochloric acid, borax, fats, greases, rosins and oils, depending upon the metals to be soldered and the particular type of solder employed. The objections to these and similar fluxes are, first, that in almost every case they exercise a corrosive action upon the usual metals employed in soldering operations; second, that in almost every case the heat of the soldering operation causes volatilization of at least some of the constituents of the fluxes, resulting in the formation of blow-holes at the soldered joint.

The object of the fluxes heretofore used has been merely to remove the impurities, such as the oxide, from the surfaces to be soldered. My invention provides an entirely different procedure. Instead of removing something from the surfaces to be soldered, I deposit upon said surfaces a uniform layer of clean, newly-formed, uncorroded material, such as a metal. It is apparent that the solder will readily adhere to this newly-formed layer. In other words, my flux forms a deposit in the nature of a binder which adheres equally well to the solder and to the surface of the material to be soldered.

To accomplish these results, I employ a solution of a metallic compound which when spread over the surface to be soldered coats said surface evenly with the metallic compound. Further, I select such compounds that can be readily reduced to the metallic state by ordinary heating and, upon the application of heat thereto, there is formed a smooth, even plating of clean, unoxidized metal on the surface to be soldered.

I prefer to use alcohol because of its cleaning and solvent properties and especially because it is undesirable to use a water solution of these compounds, due to the fact some desirable metallic compounds when dissolved in water dissociate, causing strong acid and corrosive action on metals. While a number of alcoholic solutions of metallic compounds having the properties set forth may be used, I prefer to employ a mixture of anhydrous cuprous chloride and cupric chloride, using as much of the cuprous chloride as will dissolve in methyl alcohol at ordinary temperatures, although other concentrations may be found desirable under particular conditions. This solution may be applied to the surface to be soldered in any suitable manner, as by a brush. The solution dries in a few seconds, leaving a uniform coating of anhydrous cupric and cuprous chlorides and without dissociation of the copper salts taking place.

The coating thus formed is preferably dry, non-hygroscopic and is non-corrosive to metals. Heat is then applied, by means of the usual soldering torch, or otherwise, the solder being applied either before or during the application of the heat to the surface thus coated, and the metallic copper is deposited in the form of a plating united to the surface without bubbling or frothing. The smooth, clean, newly-deposited copper layer thus formed will permit the solder to flow freely thereover and attach itself firmly thereto.

It will thus be seen that this flux and method of soldering differs from the ordinary fluxes and soldering methods in that the flux is non-corrosive, does not run under the soldering iron or in the flame, but stays exactly where it is applied and no bubbling or frothing is produced which could possibly result in the formation of blow-holes or similar defects in the soldered points.

The alcohol, when used as the solvent, has the function in this connection of acting as a very efficient vehicle, in that it permits the metallic compounds to be placed wherever desired and, at the same time, offers no opportunity for dissociation of the same.

The flux herein described is also useful as a copper coating medium, since by its use a copper coating may be readily applied to some refractory articles. The copper film or coating formed by this process may be colored by the usual coloring agents, such as ammonium sulphide to produce the black sulphide color, etc.

The invention as herein described is not to be understood as limited to the specific materials set out, which are described merely for the purpose of illustration, but will be understood to include all equivalent substances of the nature hereinbefore described and hereinafter claimed in the annexed claims.

What I claim is:—

1. A flux comprising an anhydrous alcoholic solution of a metallic compound capable of being reduced to the metallic state by heat.

2. A flux comprising a non-dissociated alcoholic solution of a metallic compound capable of being reduced to the metallic state by the application of heat thereto.

3. A flux comprising an anhydrous alcoholic solution of a copper compound capable of being reduced to metallic copper by heat.

4. A flux comprising an organic alcoholic solution of a copper salt capable of being reduced to metallic copper by heat.

5. A flux comprising an organic alcoholic solution of a plurality of copper salts capable of being reduced to metallic copper by heat.

6. A flux comprising an alcoholic solution of a plurality of anhydrous copper compounds capable of being reduced to metallic copper by heat.

7. A flux comprising a non-dissociated alcoholic solution of a plurality of copper compounds capable of being reduced to metallic copper by heat.

8. A flux comprising a non-dissociated solution of cuprous and cupric compounds capable of being reduced to metallic copper by heat.

9. A flux comprising a solution of anhydrous cupric chloride and anhydrous cuprous chloride.

10. A flux comprising an organic solution of cupric chloride and cuprous chloride.

11. A flux comprising an organic anhydrous solution of cupric chloride and cuprous chloride.

12. A flux comprising an alcohol solution of cupric chloride and anhydrous cuprous chloride.

Signed at Newark, in the county of Essex and State of New Jersey, this 20th day of July, A. D. 1922.

GEORGE ENNIS FERGUSON.